United States Patent [19]

Kutnyak et al.

[11] 4,106,968
[45] Aug. 15, 1978

[54] METHOD OF MAKING A FORMED HOSE

[75] Inventors: Thomas A. Kutnyak, Greenwood; George T. Dunn; Chester L. Guiles, both of Abbeville, all of S.C.

[73] Assignee: Automation Industries, Inc., Los Angeles, Calif.

[21] Appl. No.: 770,695

[22] Filed: Feb. 22, 1977

Related U.S. Application Data

[62] Division of Ser. No. 619,296, Oct. 3, 1975, abandoned.

[51] Int. Cl.² .............................................. B65H 81/00
[52] U.S. Cl. .................................... 156/189; 138/130; 156/194; 156/195; 264/339
[58] Field of Search ................... 156/194, 149, 189; 138/122, 130, DIG. 8; 264/339, 320, 317

[56] References Cited

U.S. PATENT DOCUMENTS

| 1,880,053 | 9/1932 | Schur et al. | 264/320 X |
| 2,723,426 | 11/1955 | Pelly | 156/194 UX |
| 3,357,456 | 12/1967 | Grawey et al. | 138/130 X |
| 3,753,635 | 8/1973 | Barnett | 264/339 X |
| 3,921,674 | 11/1975 | Logan et al. | 138/138 X |
| 3,992,505 | 11/1976 | Tally | 264/339 X |

FOREIGN PATENT DOCUMENTS

| 279,654 | 1/1966 | Australia | 156/194 |

Primary Examiner—David A. Simmons
Attorney, Agent, or Firm—Thomas L. Flattery

[57] ABSTRACT

A preformed radiator hose and a method of manufacturing such a hose are disclosed herein. A long length of an uncured hose is first fabricated by alternately wrapping layers of an uncured elastomer and fiber reinforcements around a straight mandrel. The uncured hose is then removed from the straight mandrel and cut into shorter segments. Each of these segments is then placed on a contoured mandrel having a shape corresponding to the intended configuration of the final hose and cured by heating. Although the fully cured hose does have a permanent shape, because of the unique arrangement of the reinforcements, etc., it has sufficient deformability to be easily slipped off the mandrel.

8 Claims, 6 Drawing Figures

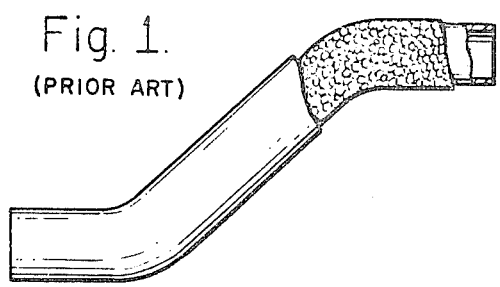
Fig. 1. (PRIOR ART)
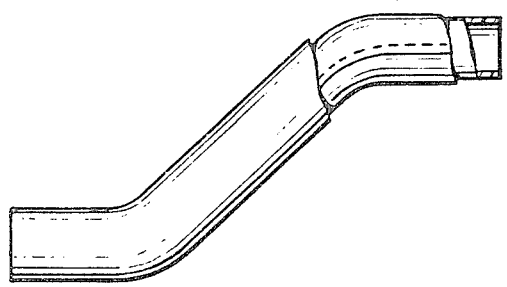
Fig. 2. (PRIOR ART)
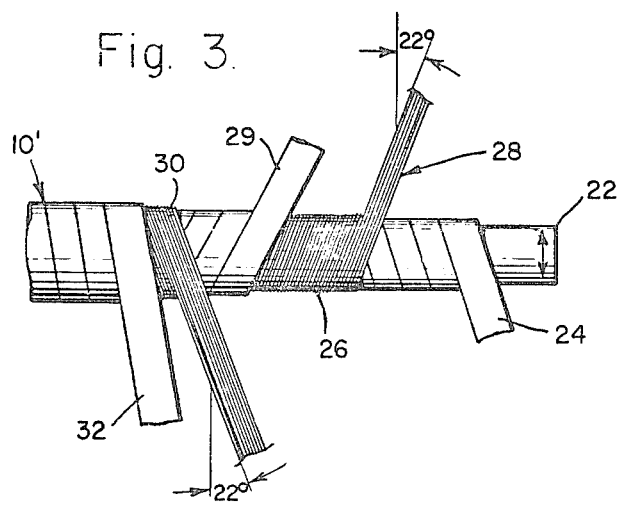
Fig. 3.
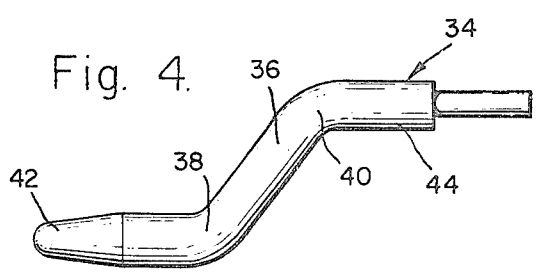
Fig. 4.
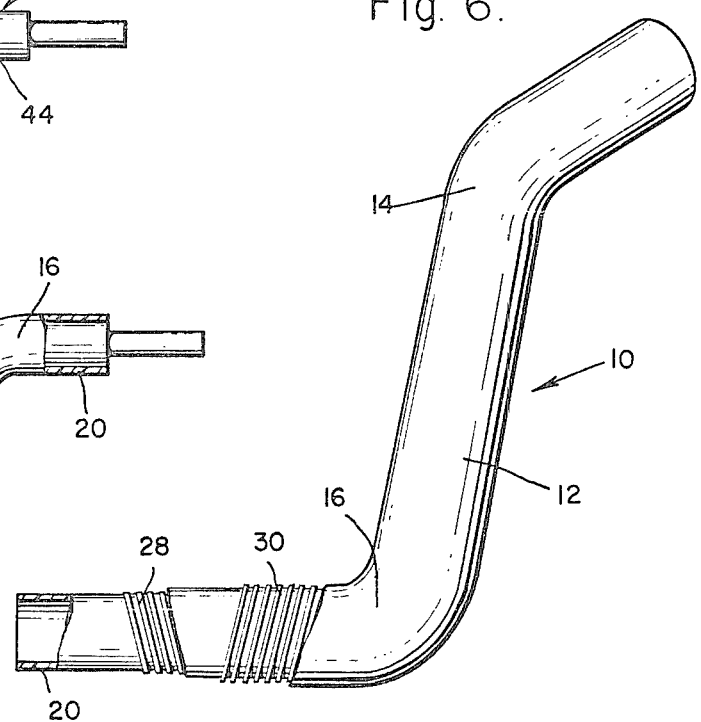
Fig. 5.
Fig. 6.

METHOD OF MAKING A FORMED HOSE

This is a division of application Ser. No. 619,296 filed Oct. 3, 1975, now abandoned.

BACKGROUND OF THE INVENTION

There are numerous requirements for flexible hoses having preformed shapes. For example, in various automotive and other types of vehicles employing liquid cooled engines, it is customary to interconnect the engine with a radiator by a flexible radiator hose. Frequently it is desirable for the hose to be fabricated into preformed shapes to accommodate the spatial requirements. At the present time there are two basic ways of forming such hoses.

In the first method an uncured hose is formed from a organic rubber or similar elastomers and a knitted reinforcing layer. A layer of the elastomer is disposed around a mandrel. Following this the knitted reinforcement is placed around the elastomeric layer. This may be accomplished by slipping a knitted sleeve over the mandrel or knitting the sleeve directly therearound. The sleeve is usually knitted with a lock stitch which allows it to be easily stretched and deformed into numerous shapes. Next a second layer of the elastomer is disposed around the knitted reinforcement. The uncured hose is then cured on the mandrel whereby it acquires a permanent shape corresponding to the shape of the mandrel.

After the curing process, the individual hoses are removed from the mandrels by sliding them off. Due to the reinforcement being a knitted sleeve, the hose has a sufficient stretch and flexibility to allow it to be slipped from the mandrel. However, due to the characteristics of the knitted reinforcement, a hose of this type has numerous undesirable limitations and objections. The hose has a limited ability to withstand an internal pressure as it tends to balloon when the pressure rises. This means the hose must operate at relatively low pressures. In addition, although the hose is flexible, there is a considerable amount of internal working when the hose is distorted. As a consequence, the hose cannot withstand continuous flexing as the various layers of elastomer and/or the knitted sleeve tend to separate. Also, the hose is subjected to being easily punctured with sharp hand tools such as screw drivers, etc.

The second method provides a hose which is reinforced by a fabric. The hose is formed by wrapping a layer of an uncured elastomer around a contoured mandrel. Next a woven fabric sleeve is wrapped around the elastomer. Following this, an outer layer of the elastomer is wrapped around the fabric. This assembly is then heated until the elastomer is fully cured. The hose is then removed from the mandrel. The use of a woven reinforcement does tend to increase the amount of pressure that the hose can withstand. However, the finished hose still has numerous disadvantages. First of all, since the fabric is woven it will not stretch easily. This makes it very difficult, if not impossible, to form the fabric around sharp bends without causing it to pucker, etc. Moveover, it is frequently very difficult to remove the fully cured hose from the mandrel unless the mandrel can be taken apart of disassembled or else is of an expendable nature that is only used and then destroyed. Moreover, a large amount of hand labor is required to lay up the hose. This, of course, greatly increases the cost of the hose. In addition, the hose is still subjected to internal working and premature failure through excessive flexing.

SUMMARY OF THE PRESENT INVENTION

The present invention provides a hose and a method of manufacturing the same which overcomes the foregoing difficulties. More particularly, a very durable hose can be readily formed into any desired configuration and still have a high pressure rating and a long life expectancy. According to the present invention, a long length of uncured hose is first fabricated on an elongated straight mandrel. This is accomplished by first wrapping an elastomer around the mandrel to form an inner liner for the hose. Next a layer of reinforcements is spirally wrapped around the elastomer. Following this, an elastomer is wrapped over the reinforcement so as to form a tie-ply. Next, a second layer of reinforcements is wrapped spirally around the mandrel in the opposite direction to the first set of reinforcements. Finally, an elastomer is wrapped around the entire assembly so as to form an outer cover for the hose. Following this, the uncured hose is removed from the elongated mandrel and cut into a plurality of short segments. The short segments are then slipped onto contoured mandrels having shapes corresponding to the desired configuration for the finished hose and cured by heating at an elevated temperature. After the hose is fully cured, it is removed from the mandrel by sliding it off.

Each of the reinforcing layers includes a plurality of individual yarns or strands that are spirally disposed inside of the hose. The angle of the spiral is quite critical. The spiral must be within a range which will allow the reinforcements to be fully effective in opposing circumferential expansion of the finished hose as a result of internal pressure. However, at the same time the angle of the spiral must be sufficiently large to allow the uncured hose to be bent around the desired radius without the fibers puckering on the inside of the bend nor unduly separating on the outside of the bend.

DRAWINGS

FIG. 1, is a view of a prior art hose with a portion thereof being broken away to show the internal construction thereof;

FIG. 2, is a view similar to FIG. 1 showing another form of prior art hose, a portion thereof being broken away;

FIG. 3, is a view of a mandrel illustrating several of the steps of a method for assembling the various elements of an uncured hose thereon according to the present invention;

FIG. 4, is a view of a contoured mandrel used for curing a hose embodying one form of the present invention;

FIG. 5, is a view similar to FIG. 4 but showing an uncured hose in position on the mandrel ready for being cured thereon;

FIG. 6, is a view of a finished hose embodying one form of the present invention, a portion thereof being broken away to show the internal structure thereof.

DESCRIPTION OF THE PRESENT INVENTION

Referring to the drawing in more detail, the present invention is particularly adapted to be embodied in a preformed reinforced hose 10 and the method for forming the hose 10. The hose 10 may be employed for a wide variety of purposes. However, for illustrative purposes, the present hose 10 may be particularly adapted for use as a so-called radiator hose. Such a hose 10 is normally used for interconnecting the cooling jacket in an engine with a radiator. As a result, the hose 10 is filled with the hot coolant and juxtaposed to the hot engine and the heat therefrom. It can be appreciated a hose 10 of this nature may be subjected to some fairly substantial temperatures and pressures.

It has been found highly desirable to fabricate the hose 10 so that it will have a permanent shape virtually the same as it will have when it is installed in its operative condition.

The embodiment of the hose 10 shown in FIG. 6 is permanently formed into a shape suitable for interconnection between a radiator and an internal engine. In the present instance it includes a straight center section 12, two elbows or bends 14 and 16 and a pair of straight end sections 18 and 20.

The initial steps in the method of forming the hose 10 can best be seen in FIG. 3. An elongated mandrel 22 is provided for forming the uncured hose 10'. This mandrel 22 is normally a straight member such as a steel bar. Normally the bar is cylindrical but it may be square, rectangular or any other shape. The length of the mandrel 22 is not critical, but it is normally several times longer than the length of the pieces of hose 10 that are to be fabricated.

A so-called uncured hose 10' is formed on the mandrel 22. An uncured hose 10' is a semi-finished structure which is essentially self-supporting and can be handled to some degree without damage. However, the elastomers therein are uncured and it is very little strength and no permanent shape. In other words, the uncured hose 10' can be easily formed into a wide variety of shapes and contours, and it will remain in that shape until it is moved into a new shape. If the uncured hose 10' is heated, the elastomeric materials therein are cured and become permanently set. The hose 10 thereafter retains the shape it was in at the time it was cured.

In order to assemble an uncured hose 10' on the mandrel 22, an elastomer is wrapped around the mandrel. Normally the elastomer is a strip 24 of uncured material. As best seen in FIG. 3, the strip 24 is wrapped spirally around the mandrel 22 while the mandrel 22 is rotated. The strip 24 is normally wrapped edge-to-edge so that it forms an essentially unbroken or uninterrupted surface. This elastomer is effective to form the inner liner of the finished hose 10.

Accordingly, the elastomer should preferably be of a material that has characteristics suitable for the intended use to which the hose 10 will be put. When the hose 10 is to be used as a radiator hose and subjected to elevated temperature, it is desirable to use a high temperature material such as a silicone rubber. By way of example, in the present instance the liner is a silicone rubber with a durometer rating of 60A. However, it should be noted that the liner may be any suitable material such as silicone, polyisoprene, chloroprene, ethylene/propylene, etc.

After the strip 24 of elastomer forming the inner liner has been wrapped onto the mandrel 22, a reinforcing layer is applied. This reinforcement normally consists of a plurality of strands 26 of fibers or yarns. Although a wide variety of fibers may be used, in the present instance the fibers used are silicone coated fiberglass strands 26. Normally the strands 26 are in the form of a strip 28 and this strip 28 is wrapped around the inner liner as the mandrel is rotated. This results in the individual strands 26 being tightly formed thereon. As will be explained in more detail subsequently, the pitch or angle of the spiral and the spacing between the filament strands 26 should be within a predetermined range.

After the reinforcing filaments or strands 26 have been wrapped around the inner liner, a second layer of elastomer is formed by wrapping a strip 29 of elastomer around the strands 26. This layer is intended to form a tie-ply. This tie-ply is usually of a material selected from the same group as the inner liner. By way of example, the present tie-ply is of a silicone rubber. However, it has been found desirable for this tie-ply to be somewhat softer than the inner liner. By way of example, this may have a durometer reading of about 50A.

Next, a second reinforcing layer is wrapped around the tie-ply while the mandrel 22 is rotated. This layer is a group of yarns or strands 30 similar to those in the first reinforcing layer. The individual strands 30 are also wrapped spirally at essentially the same pitch or angle as the first strands 26. However, the spiral is wound in a direction opposite to the first spiral.

Finally, a strip 32 of elastomer is spirally wrapped around the second layer of reinforcements as the mandrel 22 rotates. This strip 32 is intended to form the outer cover of the hose 10. Accordingly, it is usually substantially identical to the elastomer used for the liner; i.e., a silicone rubber with a durometer reading of 60A.

This results in a so-called uncured hose 10'. The uncured hose 10' is slipped axially off the mandrel 22. Although the uncured hose 10' has very little strength, the parts thereof will adhere together sufficiently to permit its being handled and processed. Next, the long length of uncured hose 10' is cut into a plurality of shorter segments. Each of these individual segments has a length which corresponds to the desired length of the finished hose 10.

Each of the individual segments of the uncured hose 10' is then slipped onto its own individual mandrel 34. These mandrels 34 are contoured to the shape for the final or finished hose 10. As can be seen in FIG. 4, the mandrel 34 includes a straight center 36, a pair of bends or elbows 38–40 and two ends 42–44. This mandrel 34 is used to produce a hose 10 similar to that shown in FIG. 6.

The contoured mandrel 34 with the uncured hose segments thereon (See FIG. 5) is next placed in an oven. The oven is effective to heat the segment to a sufficient temperature for a sufficient period of time to fully cure all of the parts thereof and to intimately bond them together into a single monolithic structure. More particularly, the elastomer, i.e., the silicone rubber in the inner liner, the tie-ply and the outer cover are cured and bonded onto all of the reinforcing strands of fiberglass. As soon as the hose 10 has cooled, it is axially slipped from the contoured mandrel 34.

As indicated above, it is important that the pitch or angle of spiral at which the reinforcing strands are wound be within a fairly narrow range. On the one hand, the strands 26 and 30 must be wound in a spiral with a pitch or angle that is sufficiently large to permit the uncured hose 10' to be easily bent on the desired radius without the reinforcing strands 26 and 30 on the inside of the bend puckering or jamming up on each other. In addition, the individual strands 26 and 30 on the outside of the bend should remain close together and not be unduly separated to provide the desired reinforcing action.

On the other hand, as the angle or pitch of the spiral increases, the strands 26 and 30 become displaced from a truly circumferential direction and tend to become less effective in preventing an enlargement or expansion of the hose 10 because of internal pressure. Therefore, the angle or pitch of the spiral should be small enough to ensure the reinforcing strands 26 and 30 being effective in preventing expansion of the hose 10.

It has been found that for most applications the angle should be almost 22° or within 1° or 2° thereof. In other words, the angle can normally vary through a range from 21° to 24° without materially interfering with their effectiveness. Moreover, it has been found that for some applications, it is practical for this angle to be somewhere in the range of about 20° to about 30°.

While only a single embodiment of the present invention is disclosed herein, it will be readily apparent to those skilled in the art that numerous changes and modifications can be made without departing from the invention. Therefore, the present disclosure is for illustrative purposes and does not in any way limit the invention which is defined only by the claims that follows.

We claim:

1. A method of forming a contoured hose including the steps of:
    providing a first cylindrical mandrel being substantially straight and having a relatively hard smooth outer surface;
    helically wrapping a first strip of elastomeric material on said first mandrel, said strip being wrapped in an edge-to-edge relationship forming an inner layer having a substantially smooth inner cylindrical core;
    helically wrapping a first layer of fiberous strands around said inner layer in a first direction to provide a first inner layer of reinforcement strands, said layer of reinforcement strands being wrapped at an angle in a range between 20° and 30° relative to a line perpendicular to a center axis of said inner cylindrical core;
    helically wrapping a second strip of elastomeric material on said layer of fiberous strands of reinforcement material to form a tie-ply for holding said first layer of reinforcement material in position during construction of said hose;
    helically wrapping a second layer of fiberous strands around said inner layer, in a second direction, to provide a second layer of reinforcement material, said second direction being opposite to said first direction, said second layer of reinforcement strands being wrapped at an angle in a range between 20° and 30° relative to a line perpendicular to the centerline axis of said cylindrical core;
    helically wrapping a third strip of elastomeric material around said second layer of fiberous strands to form an outer cover;
    providing a contoured mandrel having a relatively hard smooth surface and being contoured into predetermined shapes;
    removing said hose from said straight mandrel before said hose is cured and placing on said contoured mandrel;
    curing said hose on said contoured mandrel by subjecting said hose to an elevated temperature condition for a predetermined time to cause said layers to bond together into a monolithic structure; and
    removing said hose from said contoured mandrel after said hose is cured.

2. The method as defined in claim 1 wherein said fiberous strands being silicone coated fiberglass strands.

3. The method as defined in claim 1 wherein said elastomers being silicone and wherein said second strip being softer than said first and said third strip.

4. The method as defined in claim 1 wherein:
    said fiberous strands being silicone coated fiberglass strands and
    said elastomers being silicone and wherein said second strip being a softer silicone than said first and third strips.

5. In a method of forming a contoured hose including the steps of:
    providing a first cylindrical mandrel being substantially straight and having a relatively hard smooth outer surface.
    helically wrapping a first strip of elastomeric material on said first mandrel, said strips being wrapped in an edge-to-edge relationship forming an inner layer having a substantially smooth inner cylindrical core;
    helically wrapping a first layer of fiberous strands around said inner layer in a first direction to provide a first inner layer of reinforcement strands, said layer of reinforcement strands being wrapped at an angle in a range between 20° and 30° relative to a line perpendicular to a center axis of said inner cylindrical core;
    helically wrapping a second strip of elastomeric material on said layer of fiberous strands of reinforcement material to form a tie-ply for holding said first layer of reinforcement material in position during construction of said hose;
    helically wrapping a second layer of fiberous strands around said inner layer, in a second direction, to provide a second layer of reinforcement material, said second layer of reinforcement strands being wrapped at an angle in a range between 20° and 30° relative to a line perpendicular to the centerline axis of said cylindrical core;
    helically wrapping a third strip of elastomeric material around said second layer of fiberous strands to form an outer cover;
    removing said hose from said straight mandrel before said hose is cured;
    cutting said hose into a plurality of smaller lengths;
    providing a contoured mandrel having a relatively hard smooth surface and being contoured into a predetermined shaped and having a length substantially the same as one of the cut length of said uncured hose;
    placing one of the cut length of said uncured hose into said contoured mandrel;
    curing said cut length of hose on said contoured mandrel by subjecting said hose to an elevated temperature condition for a predetermined time to cause said layers to bond together into a monolithic structure; and
    removing said hose from said contoured mandrel after said hose is cured.

6. The method as defined in claim 5 wherein said fiberous strands being silicone coiled fiberglass strands.

7. The method as defined in claim 5 wherein said elastomers being silicone and wherein said second strip being softer than said first and said third strip.

8. The method as defined in claim 5 wherein;
    said fiberous strands being silicone coated fiberglass strands and;
    said elastomers being silicone and wherein said second strip being a softer silicone than said first and third strips.

* * * * *